United States Patent [19]

Wah et al.

[11] 4,008,971
[45] Feb. 22, 1977

[54] JOINT FOR RATTAN POLES

[76] Inventors: Wong Kam Wah; Ting Yuet Kam, both of 10 Man Wan Road, 17th Floor, Block C, Waterloo Hill, Kowloon, Hong Kong

[22] Filed: Dec. 8, 1975

[21] Appl. No.: 638,822

[30] Foreign Application Priority Data

Jan. 8, 1975 United Kingdom .................. 779/75

[52] U.S. Cl. ................................ 403/237; 403/258; 403/260
[51] Int. Cl.² ........................................... F16B 7/00
[58] Field of Search .......... 403/258, 260, 264, 237, 403/234

[56] References Cited

UNITED STATES PATENTS

| 1,579,422 | 4/1926 | Wempe | 403/260 |
| 1,734,340 | 11/1929 | Overton | 403/258 X |
| 1,884,491 | 10/1932 | Zeimann | 403/258 X |
| 3,469,869 | 9/1969 | Ramakers | 403/264 |

FOREIGN PATENTS OR APPLICATIONS 1,148,687  4/1969  United Kingdom ............... 403/258

*Primary Examiner*—Andrew V. Kundrat
*Attorney, Agent, or Firm*—McCormick, Paulding & Huber

[57] ABSTRACT

A joint for fabricating rattan furniture particularly joining two rattan poles to form a T-shaped connection which includes forming a saddle at the end of one pole, forming an axial hole in said one pole, locating an internally screw-threaded sleeve in the hole, fixing the sleeve in the hole by passing a pin through the pole and the sleeve, passing a bolt through a diametrically disposed hole in the other pole and screwing the bolt into the sleeve to seat the other pole on the saddle.

2 Claims, 5 Drawing Figures

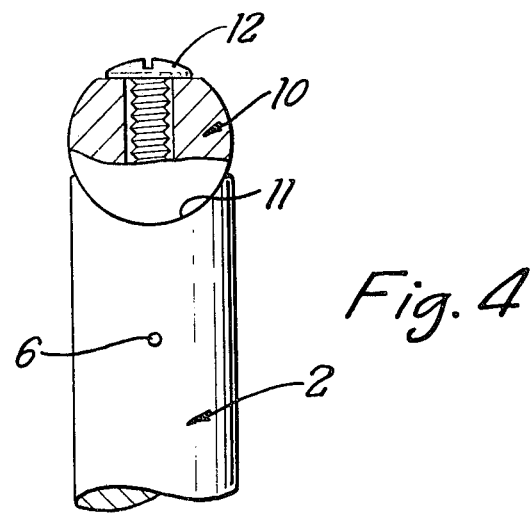
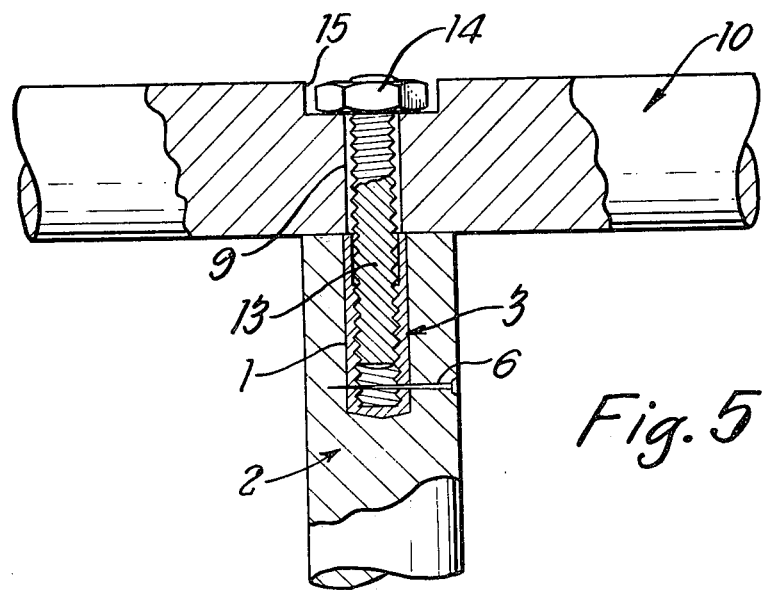

JOINT FOR RATTAN POLES

This invention relates to a method of joining a screw-threaded shank to a rattan pole, particularly in the fabrication of rattan furniture in which it is necessary to join rattan poles together.

In the fabrication of rattan furniture, for example, tables and chairs, it is usual practice to utilise rattan peel as a binding, although such binding is sometimes augmented by the use of screws.

One of the disadvantages inherent in using rattan peel to bind the pieces of rattan furniture together, is that once the binding has been established it is not an easy matter to disassemble the piece of furniture for transport purposes. Furthermore, positioning of the binding is a skilled operation. Rattan furniture when in its assembled state is extremely bulky in volume and therefore presents a transportation problem in that shipping becomes costly. Therefore, the modern tendency has been to fabricate rattan furniture in parts or modular units so that the pieces of furniture may be "knocked down" and then transported and finally reassembled at their destination. In this case the use of rattan peel cannot be used for attaching the parts or units together and some other means of attachment, which can be used by unskilled labour, then has to be found.

It is the main object of this invention to provide a method of attaching rattan poles together in the fabrication of rattan furniture which can be carried out by unskilled labour and which is readily reversible to dismount the furniture.

According to the present invention there is provided a method of joining a screw-threaded shank to a rattan pole which includes forming a hole in the pole, locating an internally screw-threaded sleeve within the hole, fixing the sleeve within the hole and screwing the shank into the sleeve. Preferably, the fixing of the sleeve within the hole is achieved by the use of a pin which passes through the pole and also through the sleeve, although any other way of fixing may be performed, for example by the use of an adhesive. The sleeve may be provided with integral and external longitudinally extending ribs so as to facilitate its retention within the hole by friction.

As will be appreciated, the bolt may be utilised to attach any other member to the pole, for example, the seat portion of a rattan chair.

One of the advantages of the method according to the present invention is that the only externally appearing part of the fixing means is the bolt head, and possibly the pin heads which fix the sleeve within the hole. The latter, of course, are very small, and therefore do not detract from the aesthetic appearance of the finished piece of furniture.

The invention also includes a method of joining two rattan poles together to form a T-shaped connection which includes shaping an end of one pole to provide a saddle having a radius of curvature equal to one half the diameter of the other said pole, providing an axial hole in said end of said one pole, locating an internally screw-threaded plastics sleeve within the hole, fixing the sleeve within the hole by passing a pin through said hole and through said sleeve, passing a bolt through a diametrically disposed hole in said other pole and screwing the bolt into the sleeve to seat the other pole in the saddle of said one pole.

In order to illustrate the invention, two embodiments thereof will now be described, by way of example only, and with reference to the accompanying drawings, in which:

FIG. 4 is an end view of the joint of FIG. 1 showing a slight modification; and

FIG. 5 is a part cross-sectional side view showing two further rattan poles joined together by the method of the invention.

Figure 1:
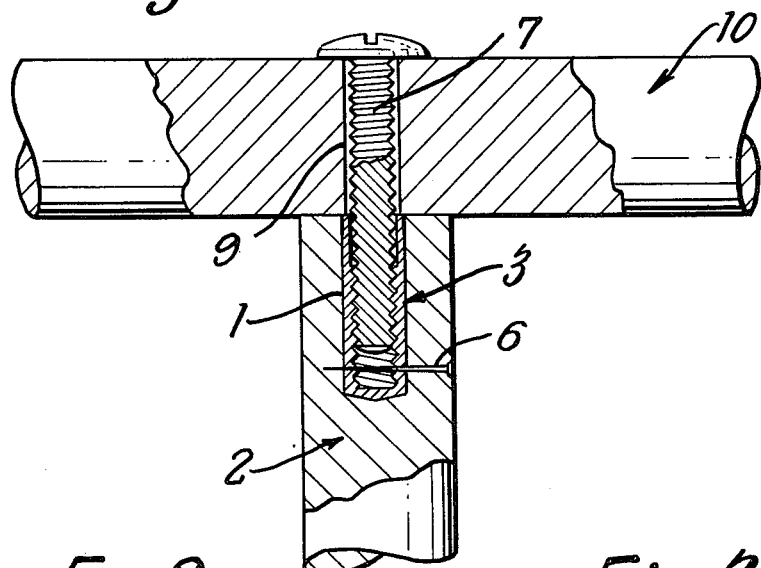
FIG. 1 is a part cross-sectional side view showing two rattan poles joined together by the method of the invention.
Figure 2:
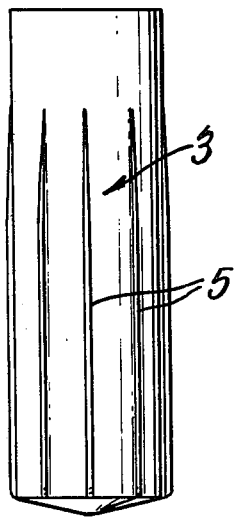
FIG. 2 is a side-elevation of a sleeve for use in the method according to the invention.
Figure 3:
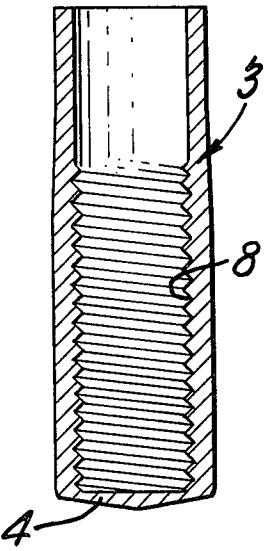
FIG. 3 is a cross-sectional view of the sleeve of FIG. 2.

A T-joint in accordance with the invention is effected by first drilling a blind hole 1 in a rattan pole 2. As illustrated in FIG. 1, the blind hole 1 is drilled axially along the pole 2, but of course this may be formed in any other convenient position. Into this hole 1 is located a sleeve 3 more particularly shown in FIGS. 2 and 3 which is preferably formed of plastics, for example, nylon. The sleeve 3 is closed at one end 4 and provided externally with longitudinally extending ribs 5 so that the sleeve forms a friction fit within the hole 1. When in position within the hole 1, the sleeve 3 will have its open end flush with the open end of the hole 1. The sleeve 3 is fixed within the hole 1 by passing one or more pins 6 laterally through the pole 2 so that they pass through the lower end of the sleeve 3 towards the inner end of the sleeve and so as not to foul a bolt 7 to be screwed into the sleeve 3. For this purpose the sleeve 3 is internally screw threaded at 8 of a pitch equal to the pitch of the screw threads of bolt 7.

A lateral hole 9 is formed in a second rattan pole 10 and the bolt 7 passed through this hole 9. The bolt 7 is then screwed into the sleeve 3 as illustrated in FIG. 1 and the joint is established. Preferably, the end of the pole 2 is formed with a saddle as shown in FIG. 4 at 11 with a radius equal to half the diameter of the pole 10 so as to receive the pole 10 and prevent any inadvertent twisting movement between the two poles 2 and 10.

FIG. 4 shows a slight modification from FIG. 1 in that the bolt head 12 is let into the pole 10 instead of standing proud as in FIG. 1.

Another embodiment is shown in FIG. 5 in which like parts to those in FIG. 1 have been given like references. In FIG. 5 instead of a bolt with an integral head being used a screw-threaded shank 13 is employed having a nut 14 screwed thereon. The nut 14 is let into the pole 10 at 15.

It will be appreciated that although the joining of two rattan poles has been described above, the invention includes the joining together of any second member to a rattan pole by the method of the invention, for example, a wooden seat of a chair may be joined to the rattan pole legs of the chair by the method according to the invention. The method of the invention is applicable to the fabrication of all types of rattan furniture.

What we claim is:
1. A mechanical joint comprising:
 a. a first cylindrical member having a generally diametrically oriented opening,
 b. a second cylindrical member having one end formed to fit the cylindrical contour of the first member and having a generally axially oriented opening aligned with said opening in said first member, c. an internally threaded insert in said opening of said second member said insert having a closed inner end abutting the inner end of said opening in said second member and extending the full length thereof, d. means for anchoring said insert in said second member opening, e. a screw extending through said first member opening and threadably received in said insert, f. said means for anchoring said insert comprises ribs on the outside surface thereof to prevent rotation of said insert in its second member opening, and including at least one pin oriented normal to the axis of said second member and extending diametrically thru said insert adjacent the inner end thereof.

2. The joint defined by claim 1 wherein said insert is formed from a plastic material.

* * * * *